United States Patent Office 3,776,984
Patented Dec. 4, 1973

3,776,984
S-DICHLOROMETHYL OXYPHOSPHORUS THIOATES
Kenneth Wayne Ratts, Creve Coeur, Mo., assignor to Monsanto Company, St. Louis, Mo.
No Drawing. Filed Oct. 4, 1971, Ser. No. 186,467
Int. Cl. C07f 9/16, 9/30, 9/38
U.S. Cl. 260—943                                                12 Claims

ABSTRACT OF THE DISCLOSURE

S-dichloromethyl oxyphosphorus thioates are prepared from substituted dichloromethane sulfenyl chlorides by reaction with a tertiary oxyphosphorus compound. The compounds of this invention are pesticidally active and particularly useful as pre-emergent herbicides.

---

This invention relates to S-dichloromethyl oxyphosphorus thioates of the formula

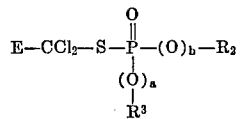

wherein $a$ and $b$ are each independently selected from zero and one, $R^2$ and $R^3$ are each independently selected from phenyl, substituted phenyl, primary or secondary lower alkyl, phenyl-substituted primary lower alkyl, and primary or secondary lower alkenyl, and

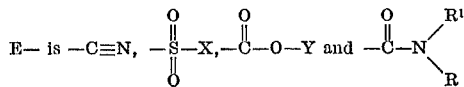

Further in the above formula, X is phenyl or substituted phenyl, Y is lower alkyl or benzyl, and R and $R^1$ are each independently selected from phenyl, substituted phenyl, lower alkyl, lower alkoxy or lower alkoxyalkyl, or R and $R^1$ when taken together are alkylene of the empirical formula $C_nH_{2n}$ wherein $n$ is an integer from 4 through 8 inclusive, and having from 4 through 8 carbons in a continuous chain between the nitrogen terminal valence bonds.

As employed herein, the term "substituted phenyl" designates phenyl groups of the formula

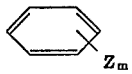

wherein Z is halo, trihalomethyl, cyano, nitro, lower alkyl or lower alkoxy, and $m$ is an integer from 1 through 3 inclusive, provided that when Z is nitro, $m$ cannot exceed 1. The term "halo" designates a halogen atom selected from fluorine, chlorine, bromine and iodine.

As employed herein, the terms "lower alkyl," "lower alkoxy" and "lower alkenyl" designate those groups wherein the aliphatic chain is straight or branched and has from 1 through 5 carbons inclusive, in the case of "lower alkyl" or "lower alkoxy," and from 2 through 5 carbons inclusive, in the case of "lower alkenyl." As employed herein, the term "lower alkoxyalkyl" designates those groups wherein the aliphati chains are straight or branched and contain a combined total of from 2 through 8 carbons inclusive.

The term "primary," when used with lower alkyl, lower alkenyl or lower alkoxy, designates that the carbon in the one-position of the group is bonded to no more than one other carbon and the term "secondary," when used with lower alkyl, lower alkenyl or lower alkoxy, means that the carbon in the one-position of the group is bonded to two other carbons.

Examples of heterocyclic groups of nitrogen and alkylene of the empirical formula $C_nH_{2n}$ wherein $n$ is an integer from 4 through 8, inclusive, and having from 4 through 8 carbons in a continuous chain between the nitrogen terminal valence bonds include, but are not limited to, pyrrolidinyl, piperidinyl, hexamethyleneimino, heptamethyleneimino, octamethyleneimino, 2-ethylpyrrolidinyl, 3-butylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl-6-methylpiperidinyl, 2-propylpiperidinyl, 3-methylhexamethyleneimino, 3,-dimethylhexamethyleneimino, and the various isomeric forms thereof.

The instant invention also includes the convenient and efficient preparation of the above compounds by the reaction of a substituted dichloromethane sulfenyl chloride of the formula E—CCl₂—S—Cl with a tertiary oxyphosphorus compound of the formula

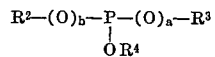

wherein E, $R^2$, $R^3$, $a$ and $b$ have the aforementioned significance. In the latter formula, $R^4$ represents hydrogen, halophenyl, trihalomethyl phenyl, mononitrophenyl, cyanophenyl, primary and secondary lower alkyl and phenyl-substituted primary lower alkyl. However, when $R^2$ or $R^3$ are halophenyl, trihalomethyl phenyl, cyanophenyl, or mononitrophenyl, and the corresponding $a$ or $b$ is one, $R^4$ must be hydrogen or lower alkyl. Further, when $R^2$ or $R^3$ are lower alkyl, and the corresponding $a$ or $b$ is one, $R^4$ must be hydrogen or lower alkyl having no more carbons than the smaller of the lower alkyl of $R^2$ or $R^3$. Finally, when $R^2$ and $R^3$ are the same halophenyl, trihalomethyl phenyl, cyanophenyl or mononitrophenyl, and both $a$ and $b$ are one, $R^4$ can be the same as $R^2$ and $R^3$. The reaction is postulated to proceed as follows:

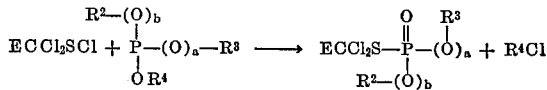

The compounds of this invention are most conveniently and efficiently prepared by the reaction of about equimolecular proportions of the reactants.

The reaction mass may consist only of the afore-described reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by, but not limited to, aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc. The chloride by-product is generally soluble in the above solvents. However, the chloride by-product is readily separated from the desired product of the reaction by vacuum distillation along with the solvent, if any is present in the reaction mass, since the chloride by-product, generally, will differ substantially in boiling point from the desired product of the reaction. The difference in boiling point is particularly apparent when the chloride by-product is hydrogen chloride or lower alkyl chloride.

The reaction is normally carried out at a temperature above the freezing point of the system but preferably not above its boiling point. Still more preferably, the reaction is carried out at temperatures of from about 0 degrees centigrade (° C.) to about 150° C. The reaction is most conveniently carried out at room temperature, above 23°

C., in the presence of a solvent. The reaction is usually carried out at atmospheric pressure, but higher or lower pressures may be utilized if equipment and other factors favor such higher or lower pressures. The reaction may be carried out in an open vessel or under reflux.

S-dichloromethyl oxyphosphorus thioates of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of substituted dichloromethane sulfenyl chlorides, used as starting materials in the preparation of the compounds of the present invention, is taught in U.S. patent applications Ser. Nos. 139,976 and 139,978 filed May 3, 1971 and each entitled "Substituted Alpha, Alpha-Dichloro-Methane Sulfenyl Chlorides and Their Manufacture."

Tertiary oxyphosphorus compounds used in the preparation of the compounds of the present invention are either known compounds or may be prepared by prior art methods from known compounds.

As illustrative of this invention, but not limitative thereof, is the following:

EXAMPLE 1

To a suitable reaction vessel equipped with an agitator is charged approximately 150 milliliters (ml.) of dichloromethane. Approximately 5.6 grams (g.), about 0.02 moles, of dichloro(diisopropylcarbamoyl)methane sulfenyl chloride and approximately 2.5 g., about 0.02 moles, of trimethyl phosphite are dissolved in the dichloromethane. The mass is agitated for about 3 hours at ambient room temperature, about 23° C. Thereafter the dichloromethane is removed by distillation leaving a white solid residue. The residue is washed with about 100 ml. of petroleum ether. The white solid is found to be soluble in acetone and ethanol, to be insoluble in water, and to have a melting point of about 129 to 131° C. and is identified by nuclear magnetic resonance as S-dichloro-(diisopropylcarbamoyl)methyl O,O-dimethyl phosphorothioate

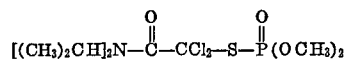

Calculated for $C_{10}H_{20}Cl_2NO_4PS$ (percent): C, 34.10; H, 5.72. Found (percent): C, 34.10; H, 5.84.

EXAMPLE 2

To a suitable reaction vessel equipped with an agitator is charged about 150 ml. of dichloromethane. Approximately 31.3 g., about 0.1 mole, of 2-(chlorothio)-2,2-dichloro-N-isopropylacetanilide is dissolved in the dichloromethane. Approximately 16.6 g., about 0.1 mole, of triethyl phosphite dissolved in about 50 ml. of dichloromethane is then added over a period of about 15 minutes. The mass is allowed to stand overnight at ambient room temperature. The dichloromethane is then removed by distillation leaving a brown oily residue. The oil is dissolved in about 100 ml. of petroleum ether and, upon cooling in Dry Ice, a tan solid crystallizes out of the solution. The tan solid is separated from the liquid by filtration, is found to be soluble in ethanol, dimethyl formamide, benzene, chloroform and acetone, to be insoluble in water, and to have a melting point of about 53 to 55° C. and is identified by nuclear magnetic resonance as S-dichloro(N-isopropyl-N-phenylcarbamoyl)methyl O,O-diethyl phosphorothioate

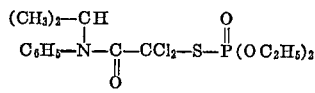

Calculated for $C_{15}H_{22}Cl_2NO_4PS$ (percent): Cl, 17.12; S, 7.74. Found (percent): Cl, 17.24; S, 7.91.

EXAMPLE 3

To a suitable reaction vessel equipped with an agitator is charged approximately 150 ml. of benzene. Approximately 5.6 g., about 0.02 mole, of dichloro(diisopropylcarbamoyl)methane sulfenyl chloride and approximately 4.2 g., about 0.02 mole, of triisopropyl phosphite are dissolved in the benzene. The mass is then agitated for about 1 hour at ambient room temperature. Thereafter the benzene is removed by distillation leaving an oily residue. The oil is dissolved in petroleum ether and, upon cooling in Dry Ice, a white solid crystallizes out of the solution. The white solid is separated from the liquid by filtration, is found to be soluble in acetone and ethanol, to be insoluble in water, and to have a melting point of about 76 to 78° C. and is identified by nuclear magnetic resonance as S-dichloro(diisopropylcarbamoyl)methyl O,O - diisopropyl phosphorothioate

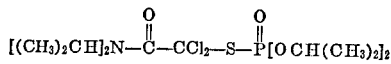

Calculated for $C_{14}H_{28}Cl_2NO_4PS$ (percent): C, 41.18; H, 6.91. Found (percent): C, 41.25; H, 6.97.

EXAMPLE 4

To a suitable reaction vessel equipped with an agitator is charged approximately 150 milliliters (ml.) of benzene. Approximately 5.6 grams (g.), about 0.02 mole, of dichloro(diisopropylcarbamoyl)methane sulfenyl chloride and approximately 3.4 g., about 0.02 mole, of triethyl phosphite are dissolved in the benzene. The mass is then agitated for about 1 hour at ambient room temperature. Thereafter the benzene is removed by distillation leaving an oily residue. The oil is dissolved in petroleum ether and, upon cooling in Dry Ice, a white solid crystallizes out of the solution. The white solid is separated from the liquid by filtration, is found to be soluble in acetone, to be insoluble in water, and to have a melting point of about 83 to 87° C. and is identified by nuclear magnetic resonance as S-dichloro(diisopropylcarbamoyl)methyl O,O-diethyl phosphorothioate $$[(CH_3)_2CH]_2N-\overset{O}{\underset{\|}{C}}-CCl_2-S-\overset{O}{\underset{\|}{P}}(OC_2H_5)_2$$

Calculated for $C_{12}H_{24}Cl_2NO_4PS$ (percent): C, 37.9; H, 6.36. Found (percent): C, 38.11; H, 6.48.

EXAMPLE 5

To a suitable reaction vessel equipped with an agitator is charged about 150 ml. of dichloromethane. Approximately 31.3 g., about 0.1 mole, of 2-(chlorothio)-2,2-dichloro-N-isopropylacetanilide is dissolved in the dichloromethane. Approximately 9.3 g., about 0.075 mole, of trimethyl phosphite dissolved in about 50 ml. of dichloromethane is then added dropwise over a period of about 30 minutes. The mass is allowed to stand at ambient room temperature overnight. The mass is agitated under vacuum until the dichloromethane is removed leaving a semi-solid. The residue is washed twice with about 100 ml. of diethyl ether. The tan solid which remains is found to be soluble in acetone, benzene, ethanol, and dimethyl formamide, to be insoluble in water, to have a melting point of about 91 to 92° C. and is identified by nuclear magnetic resonance as S-dichloro(N-isopropyl-N-phenylcarbamoyl)methyl O,O-dimethyl phosphorothioate

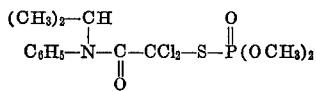

Calculated for $C_{13}H_{18}Cl_2NO_4PS$ (percent): Cl, 18.36; P, 8.02; S, 8.3. Found (percent): Cl, 18.43; P, 8.07; S, 8.43.

EXAMPLE 6

To a suitable reaction vessel equipped with an agitator is charged about 150 ml. of dichloromethane. Approximately 31.3 g., about 0.1 mole, of 2-(chlorothio)-2,2-dichloro-N-isopropylacetanilide is dissolved in the dichloromethane. Approximately 11.0 g., about 0.1 mole, of dimethyl phosphite dissolved in about 50 ml. of dichloromethane is then added dropwise over a period of about 30 minutes. The mass is allowed to stand at ambient room temperature for about 60 days. The mass is then agitated under vacuum overnight at ambient room temperature to remove the dichloromethane. An oil remains which begins to crystallize upon standing. This residue is dissolved in about 100 ml. of diethyl ether and, upon cooling in Dry Ice, a tan solid crystallizes out of the ether. The tan solid is identified by nuclear magnetic resonance as S-dichloro(N-isopropyl - N - phenylcarbamoyl)methyl O,O-dimethyl phosphorothioate the same product as prepared in Example 5.

EXAMPLES 7 THROUGH 27

The procedure of Example 2 is followed except that, in place of about 5.6 g. of 2-(chlorothio)-2,2-dichloro-N-propylacetanilide, an approximately equimolecular amount of the compound of Column A is charged and the product of Column B is obtained:

| Example | A | B |
|---|---|---|
| 7 | $(C_6H_5)_2N-\overset{O}{\underset{\|}{C}}-CCl_2-S-Cl$ | $(C_6H_5)_2N-\overset{O}{\underset{\|}{C}}-CCl_2-S$<br>$\quad\quad\quad\quad\quad\quad\quad\quad\quad\quad(C_2H_5O)_2\overset{\|}{P}=O$ |
| 8 | $(CH_3)_2CH-N-\overset{O}{\underset{\|}{C}}-CCl_2-S-Cl$<br>with 3,4-dichlorophenyl on N | $(CH_3)_2CH-N-\overset{O}{\underset{\|}{C}}-CCl_2-S$<br>$\quad\quad\quad\quad(C_2H_5O)_2\overset{\|}{P}=O$<br>with 3,4-dichlorophenyl on N |
| 9 | $C_6H_5-\overset{O}{\underset{\overset{\|}{O}}{S}}-CCl_2-S-Cl$ | $C_6H_5-\overset{O}{\underset{\overset{\|}{O}}{S}}-CCl_2-S-\overset{\|}{P}(OC_2H_5)_2$ |
| 10 | 2,6-diethylphenyl-N(CH$_2$OCH$_3$)-$\overset{O}{\underset{\|}{C}}$-CCl$_2$-S-Cl | 2,6-diethylphenyl-N(CH$_2$OCH$_3$)-$\overset{O}{\underset{\|}{C}}$-CCl$_2$-S<br>$\quad\quad\quad\quad\quad\quad\quad\quad\quad\quad\overset{\|}{O}\;(C_2H_5O)_2\overset{\|}{P}=O$ |
| 11 | $(CH_3O)_2N-\overset{O}{\underset{\|}{C}}-CCl_2-S-Cl$ | $(CH_3O)_2N-\overset{O}{\underset{\|}{C}}-CCl_2-S$<br>$\quad\quad\quad\quad\quad\quad(C_2H_5O)_2\overset{\|}{P}=O$ |
| 12 | $[CH_3(CH_2)_4O]_2N-\overset{O}{\underset{\|}{C}}-CCl_2-S-Cl$ | $[CH_3(CH_2)_4O]_2N-\overset{O}{\underset{\|}{C}}-CCl_2-S$<br>$\quad\quad\quad\quad\quad\quad\quad\quad(C_2H_5O)_2\overset{\|}{P}=O$ |
| 13 | $(CH_3)_2CHO-N-\overset{O}{\underset{\|}{C}}-CCl_2-S-Cl$<br>$\quad\quad\quad\quad\quad\underset{C_2H_5O}{\|}$ | $(CH_3)_2CHO-N-\overset{O}{\underset{\|}{C}}-CCl_2-S$<br>$\quad\quad\quad\quad\quad\underset{C_2H_5O}{\|}\quad(C_2H_5O)_2\overset{\|}{P}=O$ |

TABLE—Continued

| Example | A | B |
|---|---|---|
| 14 | C$_6$H$_5$—N(—(CH$_3$)$_2$CHO)—C(=O)—CCl$_2$—S—Cl | C$_6$H$_5$—N(—(CH$_3$)$_2$CHO)—C(=O)—CCl$_2$—S—P(=O)(OC$_2$H$_5$)$_2$ |
| 15 | C$_2$H$_4$OCH$_2$CH$_2$CH$_3$, CH$_3$O—N—C(=O)—CCl$_2$—S—Cl | C$_2$H$_4$OCH$_2$CH$_2$CH$_3$, CH$_3$O—N—C(=O)—CCl$_2$—S—P(=O)(OC$_2$H$_5$)$_2$ |
| 16 | 2,6-diiodophenyl—N—C(=O)—CCl$_2$—S—Cl | 2,6-diiodophenyl—N—C(=O)—CCl$_2$—S—P(=O)(OC$_2$H$_5$)$_2$ |
| 17 | o-CH$_3$—C$_6$H$_4$—N(—(CH$_3$)$_2$CHO(CH$_2$)$_4$)—C(=O)—CCl$_2$—S—Cl | o-CH$_3$—C$_6$H$_4$—N(—(CH$_3$)$_2$CHO(CH$_2$)$_4$)—C(=O)—CCl$_2$—S—P(=O)(OC$_2$H$_5$)$_2$ |
| 18 | N≡C—CCl$_2$—S—Cl | N≡C—CCl$_2$—S—P(=O)(OC$_2$H$_5$)$_2$ |
| 19 | Br—C$_6$H$_4$—S(=O)$_2$—CCl$_2$—S—Cl | Br—C$_6$H$_4$—S(=O)$_2$—CCl$_2$—S—P(=O)(OC$_2$H$_5$)$_2$ |
| 20 | 2,6-(CH$_3$)$_2$—C$_6$H$_3$—S(=O)$_2$—CCl$_2$—S—Cl | 2,6-(CH$_3$)$_2$—C$_6$H$_3$—S(=O)$_2$—CCl$_2$—S—P(=O)(OC$_2$H$_5$)$_2$ |
| 21 | CF$_3$—C$_6$H$_4$—S(=O)$_2$—CCl$_2$—S—Cl | CF$_3$—C$_6$H$_4$—S(=O)$_2$—CCl$_2$—S—P(=O)(OC$_2$H$_5$)$_2$ |
| 22 | 2,4,5-trichlorophenyl—S(=O)$_2$—CCl$_2$—S—Cl | 2,4,5-trichlorophenyl—S(=O)$_2$—CCl$_2$—S—P(=O)(OC$_2$H$_5$)$_2$ |
| 23 | (CH$_2$)$_4$N—C(=O)—CCl$_2$—S—Cl | (CH$_2$)$_4$N—C(=O)—CCl$_2$—S—P(=O)(OC$_2$H$_5$)$_2$ |
| 24 | (CH$_2$)$_5$N—C(=O)—CCl$_2$—S—Cl | (CH$_2$)$_5$N—C(=O)—CCl$_2$—S—P(=O)(OC$_2$H$_5$)$_2$ |
| 25 | (CH$_3$CHCH$_2$)$_2$N—C(=O)—CCl$_2$—S—Cl | (CH$_3$CHCH$_2$)$_2$N—C(=O)—CCl$_2$—S—P(=O)(OC$_2$H$_5$)$_2$ |
| 26 | (C$_2$H$_5$OCH$_2$)$_2$N—C(=O)—CCl$_2$—S—Cl | (C$_2$H$_5$OCH$_2$)$_2$N—C(=O)—CCl$_2$—S—P(=O)(OC$_2$H$_5$)$_2$ |
| 27 | CH$_3$, m-CCl$_3$—C$_6$H$_4$—N—C(=O)—CCl$_2$—S—Cl | CH$_3$, m-CCl$_3$—C$_6$H$_4$—N—C(=O)—CCl$_2$—S—P(=O)(OC$_2$H$_5$)$_2$ |

EXAMPLES 28 THROUGH 33

The procedure of Example 1 is followed except that, in place of about 2.8 g. of O,O-diethyl phosphorodithioate, an approximately equimolecular amount of the compound of Column A is charged and the product of Column B is obtained.

TABLE—Continued

| Example | A | B |
|---|---|---|
| 28 | $(C_6H_5O)_2POCH_3$ | $[(CH_3)_2CH]_2N-\overset{O}{\overset{\|}{C}}-CCl_2-S-\overset{\|}{P}=O$ with $(C_6H_5O)_2$ |
| 29 | $(C_6H_5CH_2O)_3P$ | $[(CH_3)_2CH]_2N-\overset{O}{\overset{\|}{C}}-CCl_2-S-\overset{\|}{P}=O$ with $(C_6H_5CH_2O)_2$ |
| 30 | $(Cl-C_6H_4-O)_3P$ | $[(CH_3)_2CH]_2N-\overset{O}{\overset{\|}{C}}-CCl_2-S-P(=O)(O-C_6H_4-Cl)_2$ |
| 31 | Bis(2,4,6-trimethylphenyl) isopropyl phosphite (with $OCH(CH_3)_2$) | $[(CH_3)_2CH]_2N-\overset{O}{\overset{\|}{C}}-CCl_2-S-P(=O)$ with two 2,6-dimethylphenyl groups |
| 32 | $(C_2H_5)_2POC_2H_5$ | $[(CH_3)_2CH]_2N-\overset{O}{\overset{\|}{C}}-CCl_2-S-P(=O)(C_2H_5)_2$ |
| 33 | $[(CH_3)_2CHCH_2O]_3P$ | $[(CH_3)_2CH]_2N-\overset{O}{\overset{\|}{C}}-CCl_2-S-P(=O)[OCH_2CH(CH_3)_2]_2$ |

EXAMPLES 34 THROUGH 39

The procedure of Example 6 is followed except that, in place of about 11.0 g. of dimethyl phosphite, an approximately equimolecular amount of the compound of Column A is charged and the product of Column B is obtained.

| Example | A | B |
|---|---|---|
| 34 | $C_6H_5O-\overset{H}{\underset{\overset{\|}{O}}{P}}-OCH(CH_3)_2$ | $[(CH_3)_2CH]_2N-\overset{O}{\overset{\|}{C}}-CCl_2-S-\overset{C_6H_5O}{\underset{(CH_3)_2CHO}{P}}=O$ |
| 35 | $CH_3-O-\overset{\overset{\|}{OCH_3}}{P}-O(CH_2)_4CH_3$ | $[(CH_3)_2CH]_2N-\overset{O}{\overset{\|}{C}}-CCl_2-S-\overset{O}{\overset{\|}{P}}=O$ with $CH_3(CH_2)_4O$ |
| 36 | $Cl_2C_6H_3-O-\overset{H}{\underset{\overset{\|}{O}}{P}}-OC_6H_5$ | $[(CH_3)_2CH]_2N-\overset{O}{\overset{\|}{C}}-CCl_2-S-\overset{C_6H_5O}{\underset{OC_6H_3Cl_2}{P}}=O$ |

EXAMPLE 40

Contact herbicidal activity of representative S-dichloromethyl oxyphosphorus thioates of this invention is determined by the following procedure:

The compound to be tested is applied in spray form to plants of a given age of several grasses and broadleaf species. After the plants are the desired age, each aluminum pan is sprayed with a given volume of a 0.2% concentration solution of the candidate chemical, corresponding to a rate of approximately 3.6 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Examples 5 and 6 is observed against lambsquarter and barnyard grass.

EXAMPLE 41

Pre-emergent herbicidal activity of representative S-dichloromethyl oxyphosphorus thioates of this invention is determined by the following procedure:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a said bench in the green house and watered from below as needed. The plants are observed at the end of approximately 14 days and the results recorded.

Pre-emergent activity of the compound prepared in Example 1 is observed against Canada thistle, cocklebur and nutsedge. Pre-emergent activity of the compound prepared in Example 3 is observed against Canada thistle, morning glory, lambsquarter and quackgrass. Pre-emergent activity of the compound prepared in Example 4 is observed against smartweed and quackgrass.

While this invention has been described with respect to certain embodiments, it is to be understood that it is not so limited and that variations and modifications thereof obvious to those skilled in the art to which this invention appertains can be made without departing from the spirit or scope thereof.

What is claimed is:

1. A compound of the formula

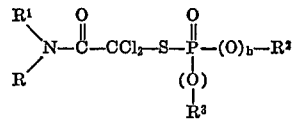

wherein R and $R^1$ are each lower alkyl, $a$ and $b$ are each independently selected from zero and one and $R^2$ and $R^3$ are each independently selected from phenyl, substituted phenyl of the formula

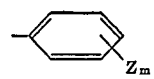

wherein Z is halo, trihalomethyl, cyano, nitro, lower alkyl or lower alkoxy, and $m$ is an integer from 1 through 3 inclusive, provided that when Z is nitro, $m$ cannot exceed 1, primary or secondary lower alkyl, phenyl-substituted primary lower alkyl, and primary or secondary lower alkenyl.

2. A compound of claim 1 wherein R and $R^1$ are each isopropyl.

3. The compound of claim 2 wherein $R^2$ and $R^3$ are each isopropyl and $a$ and $b$ are each one.

4. The compound of claim 2 wherein $R^2$ and $R^3$ are each ethyl and $a$ and $b$ are each one.

5. The compound of claim 2 wherein $R^2$ and $R^3$ are each methyl and $a$ and $b$ are each one.

6. A compound of the formula

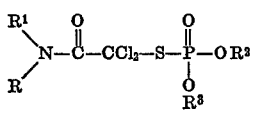

wherein $R^1$ is phenyl, halophenyl, trihalomethyl phenyl or lower alkyl phenyl and R, $R^2$ and $R^3$ are each lower alkyl.

7. A compound of claim 6 wherein $R^2$ and $R^3$ are each ethyl.

8. A compound of claim 7 wherein R is isopropyl.

9. The compound of claim 8 wherein $R^1$ is phenyl.

10. A compound of claim 6 wherein $R^2$ and $R^3$ are each methyl.

11. A compound of claim 10 wherein R is isopropyl.

12. The compound of claim 11 wherein $R^1$ is phenyl.

References Cited

Morrison: Jour. Am. Chem. Soc., vol. 77, (1955), pp. 181–2.

ANTON H. SUTTO, Primary Examiner

U.S. Cl. X.R.

71—87; 260—239 B, 293.85, 326.61, 940, 941, 949, 961, 967, 969, 999;424—200, 210, 211, 212, 216